United States Patent [19]

Shen et al.

[11] 4,048,179

[45] Sept. 13, 1977

[54] PROCESS FOR PREPARING WATER-DILUTABLE, HEAT-CURING COATING COMPOSITIONS

[75] Inventors: Kwan Ting Shen, Lakewood, N.J.; John Allister Gannon, Danbury, Conn.; Robert Charles Nelson, Middletown, N.Y.

[73] Assignee: Ciba-Geigy Corporation, Ardsley, N.Y.

[21] Appl. No.: 618,728

[22] Filed: Oct. 1, 1975

Related U.S. Application Data

[63] Continuation-in-part of Ser. No. 532,141, Dec. 12, 1974, abandoned.

[51] Int. Cl.$^2$ .................... C08L 61/24; C08L 61/28; C08L 63/02
[52] U.S. Cl. .................. 260/29.4 R; 260/29.3; 260/831; 260/834; 260/838; 260/849
[58] Field of Search .................. 260/29.4 R, 29.3, 834

[56] References Cited

U.S. PATENT DOCUMENTS

| | | | |
|---|---|---|---|
| 2,731,444 | 1/1956 | Greenlee | 260/18 EP |
| 2,897,163 | 7/1959 | Clark et al. | 260/29.2 EP |
| 2,947,717 | 8/1960 | Bélanger et al. | 260/835 |
| 3,118,848 | 1/1964 | Lombardi et al. | 260/29.4 |
| 3,182,099 | 5/1965 | Clark et al. | 260/29.2 EP |
| 3,297,519 | 1/1967 | Rambosek | 260/29.2 EP |
| 3,844,998 | 10/1974 | Jeffery et al. | 260/29.4 |
| 3,959,202 | 5/1976 | Blank | 260/29.4 |
| 3,960,983 | 6/1976 | Blank | 260/29.4 |

*Primary Examiner*—John C. Bleutge
*Attorney, Agent, or Firm*—Luther A. R. Hall

[57] ABSTRACT

A process for preparing water-dilutable, heat-curing coating compositions comprises (a) reacting an aromatic polyglycidyl ether with a polyethylene glycol in the presence of 0 to 20% of a polyhydric phenol, (b) adding an aminoplast curing agent, and (c) diluting with water to give a stable aqueous composition.

The process gives compositions which are useful in preparing coatings for a wide variety of substrates obviating the need for organic solvents with their inherent costs and environmental hazards.

18 Claims, No Drawings

PROCESS FOR PREPARING WATER-DILUTABLE, HEAT-CURING COATING COMPOSITIONS

This is a continuation-in-part of Ser. No. 532,141, filed Dec. 12, 1974 now abandoned.

This invention pertains to the process for preparing water-dilutable, heat-curable coating compositions which comprises a. reacting an aromatic polyglycidyl ether having a molecular weight in the range of 360 to 500 with a polyethylene glycol having an average molecular weight in the range of 400 to 800 in the presence of 0 to 20% by weight of a polyhydric phenol to form a water-dilutable hydroxy-containing adduct, b. adding 5 to 50% by weight of solids of an aminoplast or phenoplast curing agent, and c. diluting with water to bring the total percent solids in the range of 10 to 80% by weight and to yield a stable, aqueous composition containing no particles larger in size than 0.1 micron.

A water-dilutable composition is characterized in that the hydroxy-containing adduct and the aminoplast or phenoplast curing agent are in essentially an all-aqueous medium. The resulting composition can be further diluted with water, if required, as contrasted to conventional coating compositions where the solid materials are dissolved in an organic solvent and further dilution with water to give uniform stable compositions suitable for preparing useful coatings is not possible.

The process of this invention involves the preparation of water-dilutable coating compositions. The "water dilutable" as used herein indicates the formation of compositions which contain organic solids that are colloidally dispersed in water with no particles being visible when the composition is viewed through an optical microscope. Particle sizes present in the compositions do not exceed 0.1 micron. Moreover, this water-dilutability of the compositions of this invention is accomplished without the aid of water miscible organic cosolvents.

The water-dilutable compositions of the process of this invention are distinguished from water-soluble or water-emulsifiable compositions, but the terms "waterborne", "water-reducible" and "water-dispersible" may be used interchangeably with "water dilutable" within the definitions of said process.

The advantages of such a water system are a reduction in fire hazards since flammable organic solvents are replaced by water, the lack of odors and noxious and toxic fumes to be controlled during the manufacture and subsequent use of the coating composition, and the lack of need for an expensive solvent recovery system which would be mandated by both economic and ecological reasons.

Increasing concern about environmental and health hazards, as exemplified by the California Rule 66 ban on the release of organic vapors into the atmosphere and in recent OSHA regulations on banning undue exposure of workers to potentially toxic organic vapors often encountered in conventional coating operations, points to the need for replacing organic solvents in coating compositions with water dilutable systems. The compositions of this invention provide a practical means of preparing coatings based on epoxy and animoplast curing agents, which are known to give good coating performance, in a new and desirable process using aqueous systems thereby totally circumventing the hazards to personnel and the environment inherent with the conventional processes using organic solvents.

The coatings prepared from the compositions of this invention are essentially comparable in physical properties, appearance, durability, clarity, toughness, adhesion, strength, impact resistance and the like to coatings prepared from conventional coating compositions in organic solvents. Surprisingly these cured coatings are also essentially as insensitive to water as coatings prepared from conventional organic solvent systems.

PRIOR ART

In U.S. Pat. No. 2,731,444 the reaction of epoxy resins with polyhydric alcohols is taught to give compositions suitable as crosslinking reactants. There are disclosures of the reactions of epoxy resins with less than one equivalent of hydroxyl per epoxy group, with equivalent amounts of hydroxyl to epoxy group, but with incomplete reaction thereof, and of excess hydroxyl group per epoxy group. However, this patent does not teach or suggest the process of the instant invention. In every case, the epoxy resin disclosed has a higher molecular weight than the aromatic polyglycidyl ethers found operable in the process of this invention.

Although U.S. Pat. No. 2,731,444 does disclose the use of polyethylene glycols with a broad spectrum of molecular weights below, within and above the critical limits of the process of this invention, the only exemplification results in a product which is a wax-like solid insoluble, non-dilutable by water being clearly outside the critical limits of the present process.

While U.S. Pat. No. 2,731,444 teaches that the reaction products of epoxy resins and polyhydric alcohols, including polyethylene glycol, can be further reacted with various polyfunctional crosslinking reactants through epoxy or hydroxy groups thereon and that the reaction products of epoxy resins with less than equivalent amounts of polyhydric alcohols are valuable coating compositions, it does not teach or suggest the process of this invention for the preparation of water-dilutable, heat-curable coating compositions nor does it lay down the critical limits required to achieve the instant process. In fact, U.S. Pat. No. 2,731,444 teaches away from the instant process by broadly disclosing the reaction of epoxy resins and polyhydric alcohols without suggesting that water-dilutability is possible let alone a desirable objective. In fact, none of the exemplifications in the disclosure of this reference falls within the critical limits of the instant process.

The reaction of polyethylene glycol with an aromatic diepoxide is also taught in U.S. Pat. No. 3,563,943 for the preparation of oxyethylene-containing non-ionic compounds useful as emulsifiers for urethane latices. This patent teaches that the polyethylene glycol must have a molecular weight of from about 5,000 to about 10,000 and be reacted with an aromatic diepoxide in a mole ratio of polyethylene glycol to aromatic diepoxide of at least 2:1. The non-ionic emulsifiers resulting have a molecular weight of from 12,000–24,000. While the chemical reactions described here to prepare the emulsifier are in some ways similar to those employed in this invention, a much lower (400 to 800) molecular weight range of polyethylene glycol is needed to produce a hydroxy-containing material suitable for use in water dilutable coating compositions. In addition, a mole ratio of polyethylene glycol to poly epoxide of 1:1 to 1:3 is required in the instant process.

U.S. Pat. No. 2,951,778 teaches the use of the reaction product of poly(1,2-epoxide) with monomeric ethylene glycol at mole ratios of 2:1 to 1:2 to form a flexibilizer useful in epoxy resin formulations. Such a material would be insoluble in water and of no value in the waterdilutable process of this invention.

U.S. Pat. No. 2,947,717 teaches the use of a dihydric alcohol of molecular weight less than 600, including polyethylene glycol, in combination with a poly(1,2-epoxide) and a polycarboxylic acid anhydride for the preparation of crosslinked infusible resinous products made more fluid and hence easier to use before curing by the presence of dihydric alcohol. The various ingredients are mixed in the absence of any solvent (organic or water) and heated till homogeneous at temperatures not over 80° C. Heating at 80°–200° C affects curing and crosslinking of this system as all three components interact with one another. This system would not be water-dilutable; in fact the presence of water would render it inoperable due to premature hydrolysis of the anhydride before curing.

DETAILED DESCRIPTION

The aromatic polyglycidyl ethers that can be used in this invention comprise those organic materials which have more than one terminal vic-epoxy group, i.e.,

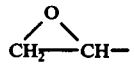

These aromatic polyglycidyl ethers are liquid polyepoxides. The polyepoxides useful in the process of this invention are derived from polyhydric phenols, preferably dihydric phenols, and may be substituted with substituents, such as chlorine, hydroxyl group, ether radicals, and the like.

The polyepoxides comprise a relatively large class of materials and have been described in numerous patents such as U.S. Pat. Nos. 2,467,171, 2,615,007, 2,716,123, 3,030,336, 3,053,855, 3,075,999 and 3,624,180. The disclosures of the various polyepoxides in said patents are incorporated herein by reference.

Epoxy polyethers are often prepared by reactions a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4 hydroxyphenyl)propane (Bisphenol A), 2,2-bis(4 -hydroxyphenyl)butane, bis(4-hydroxyphenyl)methane(bis-phenol F), 4,4'-dihydroxybenzophenone, bis(4-hydroxyphenyl)ethane, 2,2-bis(4-hydroxyphenyl)pentane and 1,5-dihydroxynaphthalene. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for seven hours to effect the reaction and the product is then washed free of salt and base.

The preparation of glycidyl polyethers of dihydric phenols is illustrated in U.S. Pat. Nos. 2,582,985, 2,615,007 and 2,633,458.

Polyepoxides having an average molecular weight between 360 and 400 are particularly preferred in the process of this invention.

Preferably the aminoplast curing agent is selected from the group consisting of urea-formaldehyde resins, melamine-formaldehyde resins, hexamethoxymethylmelamine and other nitrogen resin precursors. The amount of said aminoplast curing agent in the composition is 5 to 50% by weight of solids, and is preferably 15 to 40% by weight of solids.

Most preferably the aminoplast curing agent is a methylated urea-formaldehyde resin available commerically as "Beetle 65" from American Cyanamid, a methoxy methyl melamineformaldehyde resin available commercially as "Unformite MM-83" from Rohm and Haas or a nitrogen resin precursor, hexamethoxymethylmelamine available commerically as "Cymel 303" from American Cyanamid. The amount of said aminoplast curing agent in the composition is most preferably 20 to 30% by weight of solids.

The instant compositions are water-dilutable and yield stable, uniform compositions over a wide range of aqueous system concentrations from 10 to 80% solids by weight. Preferably the percent solids concentration range is 30 to 70% by weight and most preferably 40 to 60% by weight.

The aromatic polyglycidyl ethers useful in the process of this invention are liquid epoxy resins having an average molecular weight in the range of 360 to 500 or an average eopxy equivalent weight of 180 to 250. These aromatic glycidyl ethers are prepared by the glycidylation of polyhydric phenols using epichlorohydrin and alkali. Among the dihydric phenols which may be used to prepare the aromatic polyglycidyl ethers suitable for use in the process of this invention are: 2,2-bis(4-hydroxyphenyl)propane, 2,2-bis(3-bromo-4-hydroxyphenyl)propane, 2,2-bis(3,5-dichloro4-hydroxyphenyl)propane, 2,2-bis(3-chloro-4-hydroxyphenyl)propane, bis(4-hydroxyphenyl)methane, bis(4-hydroxyphenyl)sulfone, bis(4-hydroxyphenyl)sulfide, resorcinol and hydroquinone. The preferred dihydric phenols are 2,2-bis(4-hydroxyphenyl)propane (bis-phenol A) and bis(4-hydroxyphenyl)methane (bis-phenol F). Most preferred is 2,2-bis(4-hydroxyphenyl)propane for reasons of cost and commercial availability.

While the chemical reactions between aromatic polyglycidyl ethers and polyethylene glycol are not dependent per se on the molecular weights of the two reactants, the nature of the product is definitely dependent on the molecular weights of these reactants.

Two criteria must be met by the process of this invention for operability. These are: (1) the composition prepared by the process must be water-dilutable, essentially in the absence of any water-miscible, organic cosolvent, to yield a stable, aqueous system containing no particles larger in size than 0.1 micron; (2) the coatings prepared from such an aqueous system must be essentially equivalent in properties to epoxide coatings prepared from organic solvent systems. That is the coatings made from the compositions of the process of this invention must not have unacceptable flaws directly related to the use of water as the coating composition medium or to individual components in the hydroxycontaining adduct prepared in the first step of the process.

Preferably the aromatic polyglycidyl ether should have a molecular weight of about 360 to 400.

The polyethylene glycols useful in the process of this invention have an average molecular weight of 400 to 800, preferably 400 to 600, and most preferably 600. Mixtures of polyethylene glycols providing the same overall average molecular weight on a molar basis also may be used in the process of this invention. Thus, 0.5 mole of a 600 molecular weight glycol plus 0.5 mole of a 1000 molecular weight glycol is essentially equivalent to 1.0 mole of an 800 molecular weight glycol.

As was described with the aromatic polyglycidyl ethers, the molecular weight of the polyethylene glycol is important in whether the hydroxy-containing adduct or the final coating meets the criteria described above.

When polyethylene glycols of molecular weight less than 400 are used, the hydroxy-containing adducts formed by reaction with the aromatic polyglycidyl ether are not water-dilutable. The same is true when polyethylene glycols with molecular weights over 800 are used. There must be a proper balance of hydrophilicity brought to the hydroxycontaining adduct by the polyethylene glycol for the process to be operable. This balance is only achieved by the polyethylene glycols of average molecular weight in the range of 400 to 800.

While the water-dilutable, hydroxy-containing adduct can be prepared by reaction of an aromatic polyglycidyl ether and a polyethylene glycol, it is often advantageous to add a quantity of a polyhydric phenol as a co-reactant. A polyhydric, preferably a dihydric, phenol, such as 2,2-bis(4-hydroxyphenyl)propane or bis-phenol A, can also be added as a co-reactant provided the amount added does not exceed 20% by weight. Within the limits noted, the use of bisphenol A has no deleterious effects on the water-dilutability of the compositions made by the process of this invention or on the properties of the cured coatings prepared from said compositions.

The use of the polyhydric phenol in the first step of the process has the very advantageous effect of catalyzing the reaction between the aromatic polyglycidyl ether and the polyethylene glycol, and the time needed to prepare the hydroxy-containing adduct goes from 25 to 30 hours at 230° C. in absence of the phenolic coreactant to 8 to 12 hours at 230° C. in the presence of the phenolic coreactant.

Another important variable in the process step for preparation of the hydroxy-containing adduct is the mole ratio of the various reactants. In order to achieve water-dilutability it is necessary that the moles of aromatic polyglycidyl ether not exceed the combined moles of polyethylene glycol plus polyhydric phenol coreactant by a ratio greater than 3.0 to 1.0. At higher mole ratios of aromatic polyglycidyl ether to polyethylene glycol, water-dilutability is simply not achievable.

One the other end of the scale, where the moles of aromatic polyglcidyl ether are less than the combined moles of polyethylene glycol plus polyhydric phenol coreactant, water-dilutability is indeed achieved, but the second important criterion, namely acceptable cured coating properties deriving from the compositions made by the process of this invention, is not met. The coatings prepared from compositions where the moles of aromatic polyglycidyl ether to the combined moles of polyethylene glycol plus polyhydric phenol are in a ratio of less than 1.0 to 1.0 are unacceptable in terms of surface properties such as tackiness, blocking and scuff resistance.

Thus, the operable ratio of moles of aromatic polyglycidyl ether to combined moles of polyethylene glycol plus polyhydric phenol is 1.0/1.0 to 3.0/1.0. The range 1.25/1.0 to 1.35/1.0 is particularly preferred.

The molar ratio of polyethylene glycol to polyhydric phenol itself is also critical in order for the process to yield water-dilutable compositions. The process gives acceptable compositions in the absence of any polyhydric phenol, but, when keeping the total moles constant, the amount of polyhydric phenol is increased with a concomitant decrease in the amount of the polyethylene glycol, it was found that water-dilutability was no longer achieved if the molar ratio of polyethylene glycol to polyhydric phenol exceeded 1.0/1.5. Thus, to achieve water-dilutability the moles of polyethylene glycol to moles of polyhydric phenol in the process of this invention must be in the ratio of 1.0/0.0 to 1.0/1.5.

The first step of the process where the aromatic polyglycidyl ether is reacted with the polyethylene glycol can be carried out at a temperature in the range of 150° to 250° C, but preferably at 200° to 230° C. The reaction is carried out with good agitation under an inert atmosphere such as nitrogen or argon.

The course of the reaction is monitored by taking aliquot samples and measuring the epoxy equivalent value per 100 grams. The preferred aromatic polyglycidyl ether has an initial epoxy equivalent in the range of 0.51 to 0.54. The final epoxy equivalent values of the water-dilutable, hydroxy-containing adducts are usually in the range of 0.001 to 0.10 epoxy equivalents/100 grams, and preferably in the range of 0.015 to 0.075 epoxy equivalents/100 grams.

In the cases where 1.0 mole of aromatic polyglycidyl ether is reacted with 1.0 moles of (polyethylene glycol plus polyhydric phenol), the final epoxy equivalent value approaches zero at 100% conversion. This procedure is not preferred since there is some danger of premature gelation, presumedly by crosslinking, of the hydroxy-containing adduct.

The hydroxyl number of the hydroxy-containing adducts generally fall in the range of 2.5 to 3.5 equivalents/kilogram, /and typically 3.0 equivalents/kilogram. There does not seem to be any direct correlation between the hydroxyl number, water-dilutability and final coating properties in the process of this invention.

The aromatic polyglycidyl ethers having a molecular weight in the range of 360 to 400 are available commercially as liquid epoxy resins under a variety of trademarks such as "ARALDITE" 6010 (CIBA-GEIGY), "Epon" 838 (Shell), "DER" 331 (Dow) and "Epi-Rez" 510 (Celanese).

The polyethylene glycols of average molecular weights varying from 300 to 1000 are available commercially, e.g., the "Carbowax" products of Union Carbide or as the polyethylene glycols of Dow.

The urea-formaldehyde and melamine-formaldehyde aminoplast curing agents are commercially available, e.g., respectively "Beetle 65" of American Cyanamid, "Beckamines" of Reichhold Chemicals and the "Uformite MM-83" of Rohm and Hass and "Cymel 300" of American Cyanamid. The latter is a hexamethoxymethylmelamine material largely monomeric in structure while the other materials cited are oligomeric or polymeric in nature.

Some curing agents employed in this invention are nitrogen-containing resin precursors particularly those capable of being insolubilized at acid pH values and which act as crosslinking agents under acid conditions. These are resin precursors, urea-formaldehyde type resins and the substituted cyclic triazines. Suitable groups of resin precursors include dimethylol and polymethylol derivatives of urea, N,N'-ethylene urea, N,N'-propylene urea, dihydroxyethylene urea, thiourea, dicyandiamide, guanidine, esters of carbamic acid, methylolated aminotriazines and methylolated triazines as well as their etherification products. Other useful precursors include 1,3-bis(hydroxymethyl)2-imidazolidinone or dimethlolethyleneurea, $N^2,N^4,N^6$-tris(hydroxymethyl)melamine, /hexahydro-1,3,5,-tris(3'-methoxy propionyl)-s-triazine, benzoguanamine, ammeline, 4,6-diaminopyrimidine, acetoguanamine, melamine, benzyl urea, 3,5-diamino-triazole, diazine diamide and the like.

The aminoplast curing agents employed in this invention include the reaction products of an aldehyde with the nitrogen compounds listed above. The aldehydes that can be used conveniently include formaldehyde, acetaldehyde, paraformaldehyde, trioxane, crotonaldehyde, acrolein, benzaldehyde and furfural. The preferred nitrogen compounds are melamine and urea and the preferred aldehyde is formaldehyde.

These aldehyde condensation products contain methylol groups or similar alkylol groups depending on the aldehyde used. It is often desired To etherify the methylol group by reaction with a monohydric alcohol. While any monohydric alcohol can be used, the preferred alcohols are methanol, butanol, ethanol, pentanol, hexanol or octanol.

The amine-aldehyde condensation products are produced in a manner well known in the art, using acidic or basic catalysts and varying conditions of time and temperature. The aldehyde is often employed as a solution in water or alcohol and the condensation polymerization and etherification reactions may be carried out either sequentially or simultaneously. The reaction is usually effected in the usual formaldehyde:urea resins mol proportion of 1:1.5 to 1.4 and formaldehyde:melamine resins of 1:1.5 to 1.6. The aminoplast is preferably used in partially or completely etherified form. One preferred aminoplast used in this invention is hexamethoxymethyl melamine.

The aminoplast resins are blended with the hydroxycontaining materials of this invention in amounts ranging from 5 to 50 percent by weight based on the total weight of the solids.

In some cases acid catalysts, such as p-toulene sulfonic acid, cyclohexanesulfamic acid, butyl acid phosphate and phosphoric acid, can be added to blends of aminoplast or phenolplast and hydroxy-containing materials of this invention to increase the rate of the curing reaction, producing films or coatings that will cure at a lower temperature or in a shorter time. Up to 2 percent by weight of such acid catalysts based upon the total weight of the solids have been found to be advantageous in some instances. Polycat, a cyclamic acid, has proven to be particularly useful.

Coatings compositions prepared from a hydroxycontaining material of this invention with an aminoplast or phenolplast can be applied to a substrate by conventional means such as brushing, spraying, dipping and roller-coating. The coatings are cured by heating at 100° to 250° C from a time sufficient to effect a cure, such times generally being from about 5 minutes to about 1 hour.

Other curing agents which may be employed in the process of this invention are phenoplast resins which include etherified resols of phenolic resins, formaldehydephenol carboxylic acid resins and phenolic resin precursors.

The following examples are illustrative of the invention, but are not meant to limit the scope of the same in any fashion whatsoever.

EXAMPLE 1

Preparation of Hydroxy-Containing Adduct by Reaction of an Epoxy Resin with a Polyethylene Glycol To a four-necked, round-bottomed flask equipped with a mechanical stirrer, thermometer, reflux condenser and gas inlet tube was charged 490 grams of epoxy resin, produced from 2,2-bis(4-hydroxyphenyl)-propane and epichlorohydrin and having an epoxy equivalent weight of 185 to 196 and a molecular weight of about 380, and 600 grams of a polyethylene glycol having a molecular weight of about 600. The mixture has heated with stirring under nitrogen at a temperature of 230° C for a period of 33 hours until testing of aliquot samples showed the epoxy equivalent per 100 grams of material was 0.01. This compared to a value of 0.51–0.54 for the original epoxy resin. The resulting product was a viscous liquid which was water-dilutable.

Additional hydroxy-containing adducts were prepared using the procedure of Example 1 by the reaction of an epoxy resin of Example 1 and a polyethylene glycol. The results of these runs are given in Table I. Water-dilutability was found to depend critically on the composition of the adduct formed.

Table I

| Ex. No. | Moles Epoxy Resin | Polyethylene Glycol | | Time (hrs) Heating 230° C | Final Adduct Epoxy eq/100 g | Water-Dilutability |
|---|---|---|---|---|---|---|
| | | Moles | Molecular Weight | | | |
| 2 | 1.3 | 1 | 300 | 17 | 0.024 | No |
| 3 | 1.3 | 1 | 400 | 17 | 0.025 | Yes |
| 4 | 1.3 | 0.5 | 600 | 8.5 | 0.043 | Yes |
| | | 0.5 | 400 | | | |
| 5 | 1.5 | 0.5 | 600 | 25 | 0.003 | Yes |
| | | 0.5 | 400 | | | |
| 6 | 1.3 | 1 | 1000 | — | — | No |
| 7 | 0.9 | 1 | 600 | — | — | Yes* |
| 8 | 1.3 | 0.5 | 1000 | — | — | Yes |
| | | 0.5 | 600 | | | |
| 9 | 1.7 | 1 | 600 | — | — | No |

*Although the hydroxy-containing adduct is water-dilutable thereby meeting one of the two important criteria required of the process of this invention, the coatings prepared from such a composition after heat-curing are unacceptable being tacky and exhibiting severe blocking and surface characteristics problems.

EXAMPLE 10

When using the procedure of Example 1, an equivalent amount of an epoxy resin produced from bis(4-hydroxyphenyl)methane and epichlorohydrin and having an epoxy equivalent weight of about 180 and a molecular weight of about 360 is substituted for the epoxy resin used in Example 1, the resulting hydroxy-containing adduct is water-dilutable.

EXAMPLE 11

When using the procedure of Example 1, an equivalent amount of an epoxy resin produced from 2,2-bis(4-hydroxyphenyl)propane and epichlorohydrin and having an epoxy equivalent weight of 250 and a molecular weight of about 500 is substituted for the epoxy resin used in Example 1, the resulting hydroxy-containing adduct is water-dilutable.

EXAMPLE 12

When using the procedure of Example 1, an equivalent amount of epoxy resin produced from 2,2-bis(4-hydroxyphenyl)propane and epichlorohydrin and having an epoxy equivalent weight of 385–550 and a molecular weight of 770–1000 is substituted for the epoxy resin used in Example 1, the resulting hydroxy-containing adduct is not water-dilutable.

EXAMPLE 13

Preparation of Hydroxy-Containing Adduct by Reaction of an Epoxy Resin, Bis-phenol A and a Polyethylene Glycol Using the conditions described in Example 1, 496 grams (1.3 moles) of epoxy resin produced from 2,2-bis(4-hydroxyphenyl)propane and epichlorohydrin and having an epoxy equivalent weight of 185 to 196 and a molecular weight of about 380, 114 grams (0.5 moles) of 2,2-bis(4-hydroxyphenyl)propane, bis-phenol A, and 300 grams (0.5 mole) of a polyethylene glycol having a molecular weight of about 600 were heated under nitrogen at 230° C for a period of 10 hours until testing of aliquot samples showed an epoxy equivalent per 100 grams of maternal of 0.065. The resulting product was a viscous liquid which was water-dilutable at ambient temperatures.

Additional adducts were prepared using the procedure of Example 13 by reaction of an epoxy resin of Example 13, bis-phenol A and a polyethylene glycol. The results of these runs are given on Table II. Water-dilutability was found to depend critically on the composition of the adduct formed.

Table II

| Ex. No. | Moles Epoxy Resin | Moles Bis-phenol A | Polyethylene Glycol Moles | Polyethylene Glycol Molecular Weight | Final Adduct Epoxy eq/100 g | Water Dilut-ability |
|---|---|---|---|---|---|---|
| 14 | 1.3 | 0.1 | 0.9 | 600 | 0.056 | Yes |
| 15 | 1.3 | 0.2 | 0.8 | 600 | 0.056 | Yes |
| 16 | 1.3 | 0.3 | 0.7 | 600 | 0.060 | Yes |
| 17 | 1.3 | 0.4 | 0.6 | 600 | 0.058 | Yes |
| 18 | 1.3 | 0.6 | 0.4 | 600 | 0.064 | Yes |
| 19 | 1.3 | 0.7 | 0.3 | 600 | 0.053 | No |
| 20 | 1.3 | 0.8 | 0.2 | 600 | 0.074 | No |
| 21 | 1.3 | 0.9 | 0.1 | 600 | 0.070 | No |
| 22 | 1.3 | 0.6 | 0.4 | 600 | 0.065 | No |
| 23 | 1.3 | 0.5 | 0.5 | 300 | 0.071 | No |
| 24 | 1.3 | 0.3 | 0.7 | 300 | 0.072 | No |

EXAMPLE 25

A formulation suitable for coating applications on various substrates was prepared by mixing 33.6 grams of the adduct of Example 1 with 14.4 grams of a methylated urea-formaldehyde resin with a Gardener-Holdt viscosity at 25° C of Z3–Z6, commercially available as Beetle 65, in 52.0 grams of deionized water. The urea-formaldehyde resin acts as a curing agent in the formulation. The formulation had an initial viscosity of 46 seconds, a solids content of 45.7 percent, no organic solvent, adduct:curing agent ratio of 70:30 and pH of 7.7. The formulation had a Gardner 212 appearance color value of 16–17. No catalyst was present in the formulation.

The formulation was thoroughly mixed by use of a commercial paint shaking machine (Red Devil Paint Shaker).

The aqueous formulation was stable at room temperature.

EXAMPLE 26

A formulation suitable for coating applications on various substrates was prepared by mixing 28.7 grams of the adduct of Example 1 with 15.4 grams of a methoxy methyl melamine-formaldehyde resin 80 ± 2% solids solution in isopropanol:isobutanol (1:1) with a Gardner-Holdt viscosity at 25° C of T to Z, commercially available as "Uformite MM-83", in 55.9 grams of water. The melamineformaldehyde resins acts as a curing agent in the formulation. The formulation had an initial viscosity of 49 seconds, a solids content of 41 percent, and organic solvent content of 3.1 percent (1:1, isopropanaol-:isobutanol), adduct:curing agent ratio of 70:30 and a pH of 5.6. The formulation had a Gardner 212 appearance color value of 16–17. No catalyst was present in the formulation.

The formulation was thoroughly mixed by use of a commercial paint shaking machine (Red Devil Paint Shaker).

The aqueous formulation was stable at room temperature.

EXAMPLE 27

A formulation suitable for coating applications on various substrates was prepared by mixing 33.90 grams of the adduct of Example 1 with 5.90 grams of hexamethoxymethylmelamine with a Gardner-Holdt viscosity at 25° C of X-Z2 and an equivalent weight of 130–190, commercially available as "Cymel 303", and 0.08 grams of a catalyst, Curing Agent C (American Biosynthetics) 28.7% solids in water, in 60.12 grams of water. The hexamethoxymethylmelamine acts as the curing agent in the formulation with the addition of 0.2% on resin solids of the catalyst. The formulation had an initial viscosity of 46 seconds, a solids content of 39.8 percent, no organic solvent, adduct:curing agent ratio of 85:15 and a pH of 5.5. The formulation had a Gardner 212 appearance color value of 13.

The formulation was thoroughly mixed by use of a commercial paint shaking machine (Red Devil Paint Shaker).

The aqueous formulation was stable at room temperature.

EXAMPLE 28

The formulation prepared according to Example 25 was applied using a No. 6 1.27 cm rod onto treated aluminum. The coated substrate was then subjected to a cure cycle of 10 minutes at 204° C by baking in a forced draft oven. The average film weight on each substrate was 12 mg/25.8 cm² (4 sq in).

The coated substrate was subjected to a number of standard tests as seen on Table III to assess the performance of the coatings applied.

The cross cut adhesion test involved scribing an "X" through the coating down to the substrate. No. 610 "Scotch" brand tape was then applied to the coating over the "X" with maximum contact. The tape was then quickly pulled from the coating with a combination tensile and peeling force. No adhesion loss was permissible.

The MEK resistance test involved determining the number of single pass rubs that a cast film coating will withstand before exposure of the substrate occurs when subjected to passage of a soft cotton cloth saturated with methyl ethyl ketone wrapped around an operator's index finger with moderate pressure across the coating surface. The values were highly subjective depending on the operator, but valuable relative data on surface integrity and coating quality were obtained.

The treated aluminum substrate was Amchem 401-45 treated 5052 aluminum.

TABLE III

| Test Method | | Treated Aluminum |
|---|---|---|
| Cured Film Appearance | Color: | Clear |
| | Tack: | Dry |
| Cross Cut Adhesion (CGTM 114) | | Excellent |
| MEK Resistance (Single Rubs) | | 250 |
| Fabrication of 303 Can End | (Inside Coated) | Pass |
| Beer Pasteurization 30 Min. ° C (In Open Container) | Appearance: | No Change (Pass) |
| | Adhesion (CGTM 114): | Excellent |
| Water Pasteurization 30 Min. ° C (In Open Container) | Appearance: | No Change (Pass) |
| | Adhesion (CGTM 114): | Excellent |
| Steam Processing 90 Min. ° C; Vapor Phase: | Appearance: | No Change (Pass) |
| | Adhesion (CGTM 114) | Excellent |
| Water Phase: | Appearance: | No Change (Pass) |
| | Adhesion (CGRM 114) | Excellent |

EXAMPLE 29

The formulation prepared according to Example 26 was applied to the substrate described in Example 28. The coated substrate was cured for 10 minutes at 204° C and had an average film weight on each substrate of 12.6 mg/25.8 cm² (4 sq in).

The coated substrate was subjected to a number of standard tests as seen on Table IV to assess the performance of the applied coatings.

TABLE IV

| Test Method | | Treated Aluminum |
|---|---|---|
| Cured Film Appearance | Color: | Clear |
| | Tack: | Dry |
| Cross Cut Adhesion (CGTM 114) | Excellent | |
| MEK Resistance (Single Rubs) | | >1000 |
| Fabrication of 303 Can End | (Inside Coated) | Pass |
| Beer Pasteurization 30' at 180° F (In | Appearance: | No Change (Pass) |

TABLE IV-continued

| Test Method | | Treated Aluminum |
|---|---|---|
| Open Container) | Adhesion (CGTM 114): | Excellent |
| Water Pasteurization 30' at 180° F (In | Appearance | No Change (Pass) |
| Open Container) | Adhesion (CGTM 114): | Excellent |
| Steam Processing 90' at 250° F; Vapor Phase: | Appearance: | No Change (Pass) |
| | Adhesion (CGTM 114): | Excellent |
| Water Phase: | Appearance: | No Change (Pass) |
| | Adhesion (CGTM 114): | Excellent |

EXAMPLE 30

The formulation prepared according to Example 27 was applied to three substrates treated aluminum, tin-free steel and untreated aluminum, using No. 7 1.27 cm rod. The coated substrates were cured for 10 minutes at 204° C except that some samples of coated treated aluminum substrates were also cured for 20 minutes at 204° C. The average film weight on each substrate was 12 mg/25.8 cm² (4 sq in).

The coated substrates were subjected to a number of standard tests as seen on Table V to assess the performance of the applied coatings.

The treated aluminum substrate was Amchem 401-45 treated 5052 aluminum and the tin-free steel was U.S. Steel No. 55 tin-free steel, 2CRCTlll (Box annealed), body stock.

TABLE V

| Test Method | | Treated Aluminum | Tin Free Steel | Untreated Aluminum | Treated Aluminum (20 Min. at 204° C Cure Schedule) |
|---|---|---|---|---|---|
| Substrate Cured Film Appearance | Color: | Clear | Clear | Clear | Sl. Yellow |
| | Tack: | Dry | Dry | Dry | Dry |
| Cross Cut Adhesion | | Excellent | Excellent | Excellent | Excellent |
| MEK Resistance (Single Rubs) | | 400 | 160 | 20 | >1000 |
| Fabrication of 303 Can End | (Inside Coated) | Pass | Pass | Pass | Pass |
| Beer Pasteurization 30' at 180° F (In Open Container) | Appearance | No Change | No Change | No Change | No Change |
| | Adhesion (CGTM 114): | Excellent | Excellent | Excellent | Excellent |
| Water Pasteurization 30" at 180° F (In Open Container) | Appearance | No Change | No Change | No Change | No Change |
| | Adhesion (CGTM 114): | Excellent | Excellent | Excellent | Excellent |
| Steam Processing 90' at 250° F; Vapor Phase: | Appearance | No Change | No Change | No Change | No Change |
| | Adhesion (CGTM 114): | Excellent | Excellent | Excellent | Excellent |
| Water Phase: | Appearance | No Change | No Change | No Change | No Change |
| | Adhesion (CGTM 114): | Excellent | Excellent | Excellent | Excellent |

EXAMPLE 31

Preparation of Hydroxy-Containing Adduct by Reaction of an Epoxy Resin, Bis-phenol A and a Polyethylene Glycol Using the conditions described in Example 1, 988 grams (2.6 moles) of epoxy resin produced from 2,2-bis-(4-hydroxyphenyl)propane and epichlorohydrin and having an epoxy equivalent weight of 185 to 196 and a molecular weight of about 380, 114 grams (0.5 moles) of 2,2-bis(4-hydroxyphenyl)propane (bis-phenol A) and 300 grams (0.5 moles) of a polyethylene glycol having a molecular weight of about 600 were heated under nitrogen at 230° C for a period of 28 hours until testing of aliquot samples showed an epoxy equivalent per 100 grams of material of 0.068. The resulting product was a viscous liquid which was water-dilutable at ambient temperatures.

EXAMPLE 32

A formulation suitable for coating applications on various substrates was prepared following the procedure of Example 27 by mixing 14.02 grams of the adduct of Example 31 with 1.50 grams of hexamethoxymethylmelamine ("Cymel 303"), 0.09 grams of a catalyst, curing agent C, 0.05 grams of silicone flow control agent (BYK 301, commercially available from Mallinckrodt) in 84.34 grams of deionized water. The formulation had an initial viscosity of 41 seconds, a solids content of 15.5 percent, no organic solvent and an adduct: curing agent ratio of 90:10.

The formulation was stable at room temperature.

EXAMPLE 33

A formulation was prepared following the procedure of Example 32 by mixing 15.10 grams of the adduct of Example 31 with 2.55 grams of hexamethoxymethylmelamine, 0.07 grams of Curing Agent C and 0.04 grams of silicone flow control agent in 82.24 grams of deionized water. The formulation had an initial viscosity of 51 seconds, a solids content of 17.7 percent, no organic solvent, an adduct: curing agent ratio of 85:15 and a pH value of 6.0.

The formulation was stable at room temperature.

EXAMPLE 34

The formulation prepared according to Example 32 was applied using a No. 10 RDS rod onto a treated aluminum substrate. The coated aluminum was subjected to a cure cycle of 10 minutes at 204° C (400° F) by baking in a forced draft oven. The average film weight on the aluminum was 10–14 mg./25.8 cm² (4 sq in).

The coated aluminum was tested as described in Example 28. The film appearance on the aluminum showed excellent flow and coverage.

The MEK resistance (Single Rubs) value was 280 showing excellent performance. The pencil hardness resistance of the film was 5H (very good hardness). The T-bend flexibility values were 5T showing good flexibility and adhesion of the film to the substrate.

The Dye Cure Test (wherein a 1.4% solution of technical grade Methyl Violet dye in butyl cellosolve is applied to a film for 30 seconds; the film is then wiped dry and compared to a No. 2 standard dye rating chart where values of 0 to 10 are recorded; low values are preferred) was carried out on the coated substrate. A value of 4 was obtained indicating acceptable performance for the coating.

EXAMPLE 35

The formulation prepared according to Example 33 was applied using a No. 7 RDS rod onto various substrates indicated below. The coated substrates were subjected to a cure cycle of 10 minutes at 204° C (400° F). The average film weight on each substrate was 11.6 mg/25.8 cm² (4 sq in).

The coated substrates were tested as described in Example 28.

| Film Appearance | |
|---|---|
| Treated Amchem Aluminum | Excellent Flow |
| Treated A272 Aluminum | Excellent Flow |
| Untreated A376 Aluminum (Prebaked) | Excellent |

| -continued | |
|---|---|
| Tin Free Steel | Excellent Flow |
| Tin Plate (Prebaked) | Excellent |
| MEK Resistance (Single Rubs) | |
| Treated Amchem Aluminum | >500 (Excellent) |
| Treated A272 Aluminum | >500 (Excellent) |
| Untreated A376 Aluminum | 20 |
| Tin Free Steel | 180 (Very Good) |
| Tin Plate | 50 |
| T-Bend Flexibility | |
| Treated Amchem Aluminum | 6T, 6T |
| Fuming Factor (Solids Loss While Curing Film) | |
| Treated Amchem Aluminum | 6.19%, 6.3% |

What is claimed is:

1. A process for preparing water-dilutable, heat-curing coating compositions which comprises
    a. reacting an aromatic polyglycidyl ether having a molecular weight in the range of 360 to 500 with a polyethylene glycol having an average molecular weight in the range of 400 to 800 in the presence of 0 to 20% by weight of a polyhydric phenol to form a water-dilutable, hydroxy-containing adduct, wherein the moles of aromatic polyglycidyl ether to combined moles of polyethylene glycol plus polyhydric phenol are in the ratio of 1.0/1.0 to 3.0/1.0 and wherein the moles of polyethylene glycol to moles of polyhydric phenol are in the ratio of 1.0/0.0 to 1.0/1.5,
    b. adding 5 to 50% by weight of solids of an aminoplast curing agent, and
    c. diluting with water to bring the total percent solids in the range of 10 to 80% by weight and to yield a stable, aqueous composition containing no particles larger in size than 0.1 micron.
2. A process according to claim 1 wherein
    the aromatic polyglycidyl ether has a molecular weight in the range of 360 to 400,
    the polyethylene glycol has an average molecular weight in the range of 400 to 600, and
    the amount of polyhydric phenol is 0 to 20% by weight.
3. The process according to claim 1 wherein the polyethylene glycol has an average molecular weight of 600.
4. The process according to claim 1 wherein the moles of aromatic polyglycidyl ether to combined moles of polyethylene glycol plus polyhydric phenol are in the ratio of 1.25/1.0 to 1.35/1.0.
5. The process according to claim 1 wherein the total percent solids are in the range of 30 to 70% by weight.
6. The process according to claim 1 wherein the total percent solids are in the range of 40 to 60% by weight.
7. The process according to claim 1 wherein the aminoplast curing agent is present in the amount of 15 to 40% by weight of solids.
8. The process according to claim 1 wherein the aminoplast curing agent is present in the amount of 20 to 30% by weight of solids.
9. The process according to claim 1 wherein the aminoplast curing agent is a methylated urea-formaldehyde resin.
10. The process according to claim 1 wherein the aminoplast curing agent is a methoxy methyl melamine-formaldehyde resin.
11. The process according to claim 1 wherein the aminoplast curing agent is hexamethoxymethylmelamine.
12. The process according to claim 1 wherein the aromatic polyglycidyl ether is derived from 2,2-bis(4- hydroxyphenyl)propane or bis(4-hydroxyphenyl)methane.

13. The process according to claim 1 wherein the aromatic polyglycidyl ether is derived from 2,2-bis(4-hydroxyphenyl)propane.

14. The process according to claim 1 wherein the reaction of the aromatic polyglycidyl ether and polyethylene glycol in the presence of 0 to 20% by weight a polyhydric phenol is carried out at a temperature of 150° to 250° C.

15. The process according to claim 14 wherein the reaction is carried out at a temperature of 200° to 230° C.

16. The process according to claim 1 wherein the water-dilutable, hydroxy-containing adduct has an epoxy value of between 0.001 to 0.10 equivalents/100 grams.

17. The process according to claim 1 wherein the water-dilutable, hydroxy-containing adduct has an epoxy value of between 0.015 to 0.075 equivalents/100 grams.

18. A water-dilutable, heat-curing coating composition consisting essentially of the product obtained according to the process of claim 1.

* * * * *